US008982399B2

United States Patent
Bloch et al.

(10) Patent No.: US 8,982,399 B2
(45) Date of Patent: *Mar. 17, 2015

(54) APPLICATION MANAGEMENT OF PRINTING REQUESTS THROUGH INDUCED ANALYTICS

(71) Applicant: International Business Machines Corporation, Armonk, NY (US)

(72) Inventors: Darryl B. Bloch, Cary, NC (US); Colin M. Marshallsea, Cary, NC (US); Linda M. Twaddle, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,120

(22) Filed: Jan. 8, 2014

(65) Prior Publication Data

US 2014/0160528 A1    Jun. 12, 2014

Related U.S. Application Data

(63) Continuation of application No. 13/711,081, filed on Dec. 11, 2012.

(51) Int. Cl.
   *G06F 3/12*      (2006.01)
   *G06K 15/00*    (2006.01)
   *H04M 11/00*   (2006.01)

(52) U.S. Cl.
   CPC ............ *G06F 3/1268* (2013.01); *G06F 3/1221* (2013.01); *G06F 3/1273* (2013.01)
   USPC ..... 358/1.15; 358/1.14; 358/1.16; 379/93.24; 379/100.08

(58) Field of Classification Search
   CPC ................ G06Q 10/107; G06F 3/1292; H04L 29/06027; H04N 1/00209
   See application file for complete search history.

(56) References Cited

U.S. PATENT DOCUMENTS

| | | |
|---|---|---|
| 6,594,351 B1 * | 7/2003 | Bhogal et al. ............ 379/100.01 |
| 6,646,758 B1 | 11/2003 | Anderson et al. |
| 6,678,068 B1 | 1/2004 | Richter et al. |
| 7,212,309 B1 | 5/2007 | Sellers et |
| 7,783,614 B2 | 8/2010 | Jones et al. |
| 2005/0168776 A1 * | 8/2005 | Yamaguchi .................. 358/1.15 |
| 2007/0049302 A1 * | 3/2007 | Mickeleit ...................... 455/466 |
| 2009/0231609 A1 | 9/2009 | Chipchase et al. |
| 2010/0141994 A1 | 6/2010 | Odagiri |
| 2010/0318537 A1 | 12/2010 | Surendran et al. |

FOREIGN PATENT DOCUMENTS

JP     2000122835 A    4/2000

\* cited by examiner

*Primary Examiner* — Thomas Lett
(74) *Attorney, Agent, or Firm* — Damion Josephs; Arnold Bangali

(57) ABSTRACT

An approach for managing printing requests of a computer printing system is provided. In one aspect, the approach comprises a computing printing system receiving a printing request based on parameters of a printing request data. The approach further comprises the computing printing system determining printing alternatives for the printing request based on the printing request data. In addition, the computing printing system detects if the printing request can be archived in an email repository or transmitted to a mobile device of the requestor based on the printing alternatives. Moreover, the approach further comprises the computing printing system redirecting the printing request to one or more of an email archive of the email repository or the mobile device based on the detection of the printing request.

8 Claims, 7 Drawing Sheets

APPLICATION MANAGEMENT OF PRINTING REQUESTS THROUGH INDUCED ANALYTICS

CROSS REFERENCE TO RELATED APPLICATION

This application is a continuation of U.S. patent application Ser. No. 13/711,081 filed Dec. 11, 2012 the entire content and disclosure of which is incorporated herein by reference.

FIELD OF THE INVENTION

The present invention relates generally to printing systems, and more particularly to management of printing requests, and transmission of the printing requests to either an email archive or a mobile device.

BACKGROUND OF THE INVENTION

Environmental impact of printed electronic documents or paper materials has led to regulations for printing paper from print output devices. Environmental rating systems including, for instance, Leadership in Energy and Environmental Design (LEED®) (LEED is a registered trademark of United States Green Building Council in the United States, other countries or both), provide a framework for organizations to implement environmentally responsible strategies for buildings, offices, computing systems, etc. of the organization. In addition, a typical printer setting includes a plurality of networked printer output devices that are configured to print electronic documents for members of organizations. However, it is common for certain members to transmit large material and energy-intensive printing requests of the electronic documents to print output devices without consideration of organizational or corporate environmental strategies or principles.

SUMMARY

In one embodiment of the present invention, a method is provided for managing printing request based on parameters of a printing request data. The method comprises a computer system receiving a printing request based on parameters of the printing request data. The method further comprises the computer system determining printing alternatives of the printing request based on the printing request data. The method further comprises the computer system detecting if the printing request can be archived in an email repository or transmitted to a mobile device of a requestor based on the printing alternatives. The method further comprises the computer system redirecting the printing request to one or more an email archive of the email repository or the mobile device based on the detection.

In another embodiment, a computer system is provided for managing printing request based on parameters of a printing request data. The computer system comprises of one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to receive a printing request based on parameters of a printing request data. The computer system further comprises program instructions to determine printing alternatives of the printing request based on the printing request data. The computer system further comprises program instructions to detect if the printing requests can be archived in an email repository or transmitted to a mobile device of the requestor based on the printing alternatives. The computer system further comprises program instructions to redirect the printing request to one or more of an email archive of the email repository or a mobile device of the requestor based on the detection.

In another embodiment, a computer program product is provided for managing printing request based on parameters of a printing request data. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to receive a printing request based on parameters of a printing request data. The computer program product further comprises program instructions to determine printing alternatives of the printing request based on the printing request data. The computer program product further comprises program instructions to detect if the printing requests can be archived in an email repository or transmitted to a mobile device of the requestor based on the printing alternatives. The computer program product further comprises program instructions to redirect the printing request to one or more of an email archive of the email repository or a mobile device of the requestor based on the detection.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein, like reference numerals indicate like components, and:

DETAILED DESCRIPTION

Embodiments of the present invention comprise one or more circuits or subassemblies of circuits, as well as, methods of operation that manage printing requests of a client program, and transmission of the printing requests to either an email archive or a mobile device based on examination of printing requests.

In particular, a printing server facilitates detection of at least one component of the printing requests, and based on the detection, the printing server provides options to a requestor of the printing requests to either transmit the printing requests to the email archive for storage on the printing server, transmit the printing requests to a mobile program of the mobile device for display of an electronic copy of the printing request, or transmit the printing requests for hardcopy printing on a print output device, as described in more details below, in accordance with embodiments of the present invention.

Figure 1:
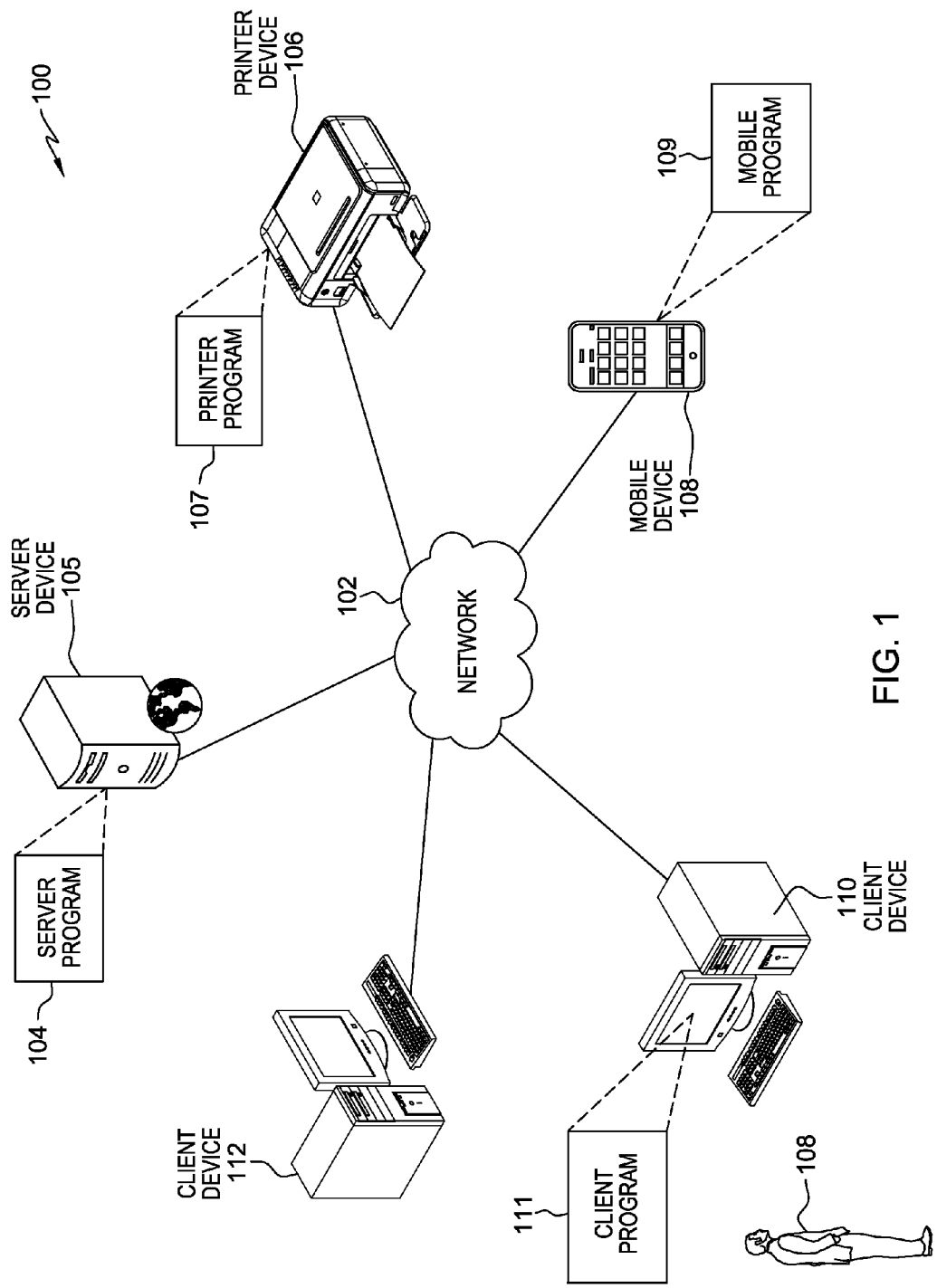
FIG. 1 is a functional block diagram of a print management system in accordance with embodiments of the present invention.

Further aspects of the present invention will now be described in conjunction with the Figures. Referring to FIG. 1, print management system 100 for managing one or more printing requests is depicted. Print management system 100 comprises network 102, server device 105, printer device 106, mobile device 108, and client devices 110, 112. Printer device 106, mobile device 108, client devices 110, 112 are clients to server device 105, interconnected over network 102.

Client devices 110, 112, can be for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Each of client devices 110, 112 comprises client program 111. Client program 111 can be any software application that is compatible to receive printing requests from requestor 113, and dynamically transmit the printing requests to server device 105 for examination of parameters of the printing requests.

Mobile device 108 can be any portable device which provides computing and information storage and retrieval capabilities, including, for example, a handheld device or handheld computer, pocket PC, connected organizer, electronic book (eBook) reader, a personal digital assistant (PDA), or a smart phone, such as, for example, Blackberry® or iPhone® or other handheld devices. Mobile device 108 includes mobile program 109. Mobile program 109 receives data files of an electronic document pertaining to a printing request from server device 105, and displays the electronic documents on a user interface of mobile device 108, in accordance with embodiments of the present invention.

Printer device 106 can be any electronic printing device that incorporates printing functionality of multiple other devices, including for example, scanner, photocopier, fax, or email. Printer device 106 includes printer program 107. Printer program 107 monitors information pertaining to detection of whether printing parameters of printer device 106, including, for example, page margin data, page layout data, paper orientation data, print toner data, and/or paper size data are compatible with printing parameters of printing requests of client program 111. The monitored printing parameters of printer device 106 are transmitted to server device 105 for examination, and based on the examination, requestor 113 is provided with options to transmit the printing requests of client program 111 to either of the email archive of client devices 112, 110, mobile device 108, or printer device 106.

Server device 105 is a server based system, including, for example, a web server, printing management server or other electronic or computing system for processing printing requests from client devices 110, 112. Server device 105 controls examination of the printing requests based on parameters of printing requests of client program 111, and based on the examination, server device 105 controls transmission of the electronic documents to either of an email archive, mobile device 108 or printer device 106. Server device 105 can also represent a "cloud" of computers interconnected by one or more networks, where server device 105 can be a primary server of a computing system utilizing clustered computers when accessed through network 102. For example, a cloud computing system can be an implementation of transmission of electronic documents of the printing request to the email archive or mobile device 108. Server device 105 includes server program 104. Server program 104 performs functions to examine parameters of the printing request and determine printing alternatives of the printing request including at least one of: (1) archiving the printing requests in an email archive storage of sever device 104; (2) transmitting the printing requests to mobile device 108 for display; or (3) transmit the printing requests to printer device 106, in accordance with embodiments of the present invention.

Network 102 includes one or more networks of any kind that can provide communication links between various devices and computers connected together within print management system 100. Network 102 also includes connections, such as wired communication links, wireless communication links, or fiber optic cables. Furthermore, network 102 can be implemented as a number of different types of networks, including, for example, a local area network (LAN), wide area network (WAN) or a packet switched telephone network (PSTN), or some other networked system. Network 102 can include the Internet representing a worldwide collection of networks.

Figure 2:
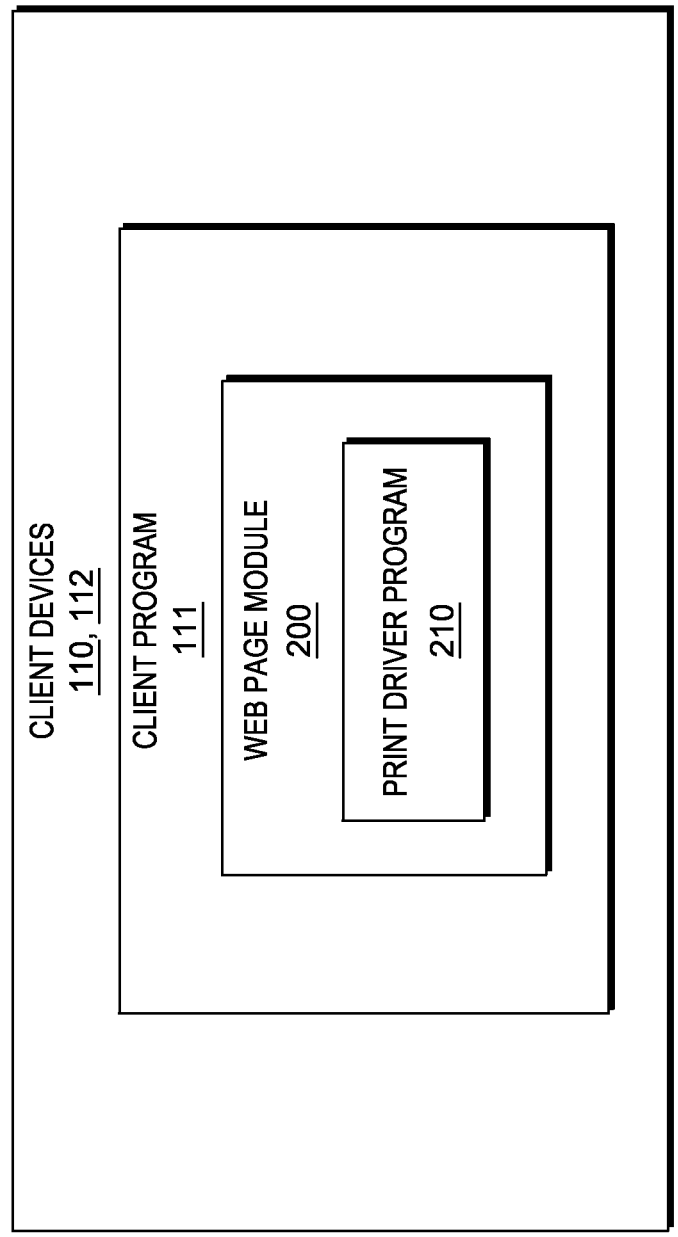
FIG. 2 is a functional block diagram illustrating components of a client device, in accordance with an embodiment of the present invention.

FIG. 2 is a functional block diagram illustrating components of client devices 110, 112, in accordance with an embodiment of the present invention. Client program 111 can, among other things, retrieve and display content transmitted from server program 104 via network 102, such as, for example, electronic documents of printing requests. Client program 111 can be a web browser. Examples of web browsers include Internet Explorer® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively. Requestor 113 is actively authenticated to configure printing parameters for printing electronic documents in client program 111.

The configured print parameters can include page margin data, page layout data, paper orientation data, print toner data, and/or paper size data. Client program 111 comprises web page module 200. Web page module 200 is a web browser plugin/add-on that extends the functionality of client program 111 by adding additional user interface elements to a user interface of client program 111. The additional user interface allows transmission of printing requests from client program 111 to server program 104. For example, web page module 200 can be IBM Lotus Notes® (IBM, Lotus Notes are registered trademarks of International Business Machines Corporation in the United States, other countries of both) collaborative email application. Web page module 200 comprises print driver program 210. Print driver program 210 performs operations to archive an email or transmit printing requests to mobile device 108 based on configurations of the printing requests. In one embodiment, the configurations together with the printing requests are transmitted to server program 104 by print driver program 210.

Figure 3:
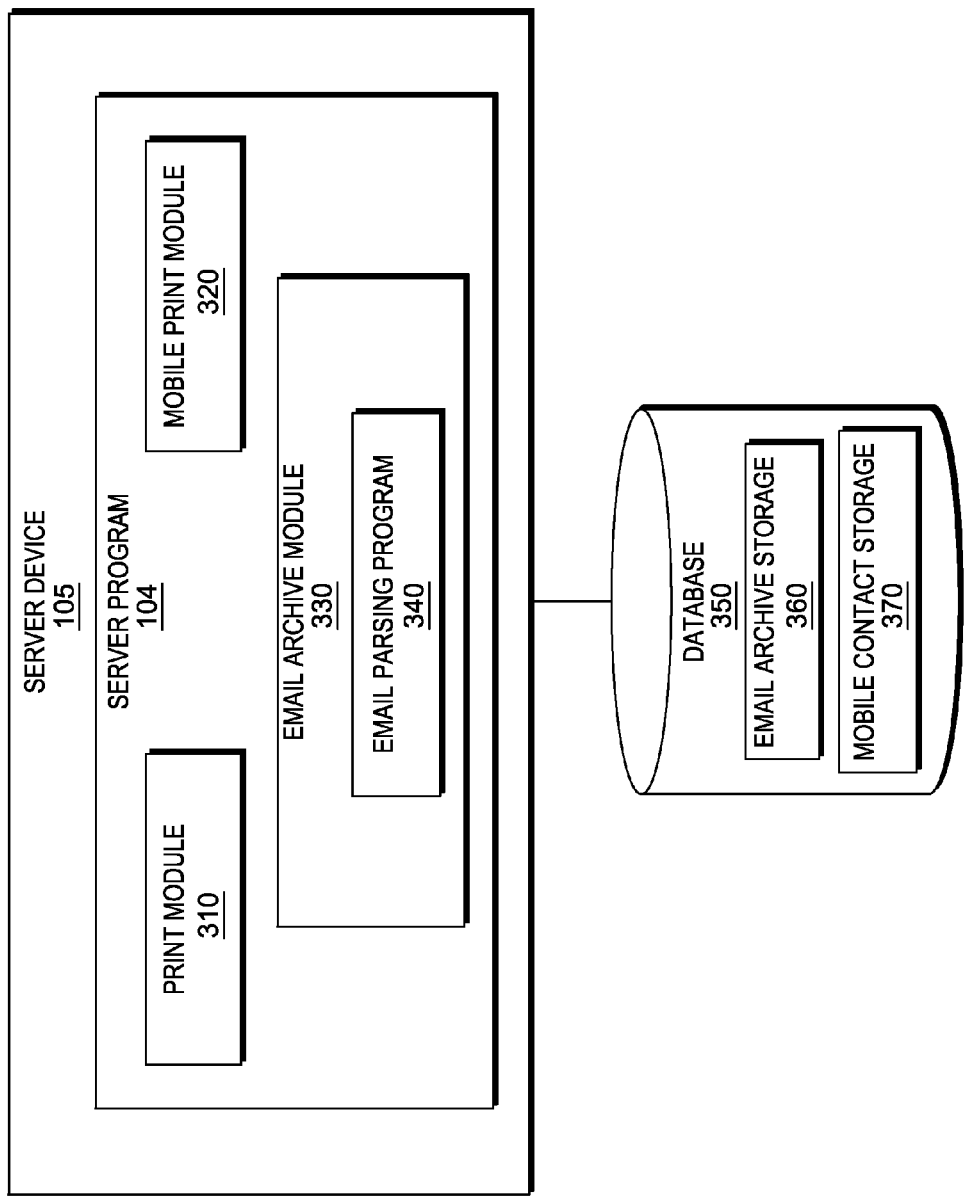
FIG. 3 is a functional block diagram illustrating components of a server device, in accordance with an embodiment of the present invention.

FIG. 3 is a functional block diagram illustrating program components of server device 105, in accordance of embodiment of the invention.

Server device 105 comprises server program 104 and database 350. Database 350 can be any type of storage device, storage server, storage area network, redundant array of independent discs (RAID), cloud storage device, or any type of data storage that maintains information pertaining to one or more configurations of email archives of client program 111. Database 350 also includes information pertaining to mobile device 108. In particular, database 350 includes email archive storage 360 and mobile contact storage 370. Email archive storage 360 stores and indexes email contents of client program 111 for future search. Mobile contact storage 370 stores mobile information of mobile device 108, in accordance with embodiments of the present invention.

Server program 104 comprises print module 310, mobile print module 320 and email archive module 330. Print module 310 receives printing requests configured in client program 111 by requestor 113. The printing requests include parameters of electronic documents. Specifically, the print parameters include page margin data, page layout data, paper orientation data, print toner data, and/or paper size data of the electronic documents based on the printing requests in client program 111. Mobile print module 320 examines the parameters of printing requests to determine whether the printing requests are suitable for transmission to mobile program 109. Furthermore, based on the examination by mobile print module 320, client program 111 presents requestor 113 with a choice to transmit the printing requests for display on mobile device 108 or continue to print the electronic document at printer device 106. In one embodiment, if requestor 113 selects to send the printing requests to mobile device 108, mobile print module 320 transmits the printing requests to mobile device 108 for display.

Email archive module 330 examines printing requests of client program 111 to determine whether the printing requests are part of an email of client program 111 including, for example, Lotus Notes®, as described above. Based on the determination, email parsing program 340 examines email contents of the email to determine if the printing requests are suitable for archive in email archive storage 360 by capturing the email contents from client program 111. In one embodiment, email parsing program 340 dynamically captures the email contents based on identification of at least one of a sender of the email, urgency of the email, or subject matter of the email contents. If the printing request is suitable for email archive, a message is presented to requestor 113, indicating whether requestor 113 desires to archive the email. If requestor 113 elects to archive the email, email archive module 330 stores and indexes the email contents in email archive storage 360 for future searches of the email.

Figure 4A:
FIG. 4A illustrates an email request message for archiving a printing request in an email repository, in accordance with an embodiment of the present invention.

FIG. 4A illustrates email request message 430 for archiving a printing request in an email repository.

In the depicted embodiment, if server program 104 determines that the printing request is an email, client program 111 displays email request message 430 indicating that it appears that the electronic document of printing requests is an email and the electronic document can be electronically archived. If user selects default option, in this case, "No" 440, the printing requests aborts, and client program 111 provides requestor 113 with options to select one or more folders to archive the electronic document. In other embodiments, the default option can be "YES". Furthermore, if requestor 113 selects "Yes" 450, the printing request is submitted to print output device 106 for printing.

Figure 4B:
FIG. 4B illustrates a mobile request message for transmitting printing requests to a mobile device, in accordance with an embodiment of the present invention.

FIG. 4B illustrates mobile request message 460 for transmitting printing requests to mobile device 108.

In the illustrated embodiment, if server program 104 determines that the printing requests are suitable for transmission to mobile device 108, client program 111 displays mobile request message 460, inquiring if requestor 113 considered sending the printing requests to mobile device 108 of either requestor 113 or, for example, one or more mobile devices of team members of requestor 113. Furthermore, if requestor 113 selects "Yes" 480 to transmit the printing requests to mobile device 108, server program 104 presents requestor 113 with options to select one or more contact numbers of mobile devices, of one or more individuals that requestor 113 elects to transmit an electronic document of the printing requests. In one aspect, the contact list is stored in mobile contact storage 370. The contact list of mobile numbers can include names of groups of teams or individuals of requestor 113. Requestor 113 can elect to transmit an SMS message to mobile device 108, indicating a message that a printing request has been or will be submitted to mobile device 108 as elected by requestor 113. On the other hand, if requestor 113 selects default option "No" 470, the printing requests are submitted to printer device 106 for printing.

Figure 5:
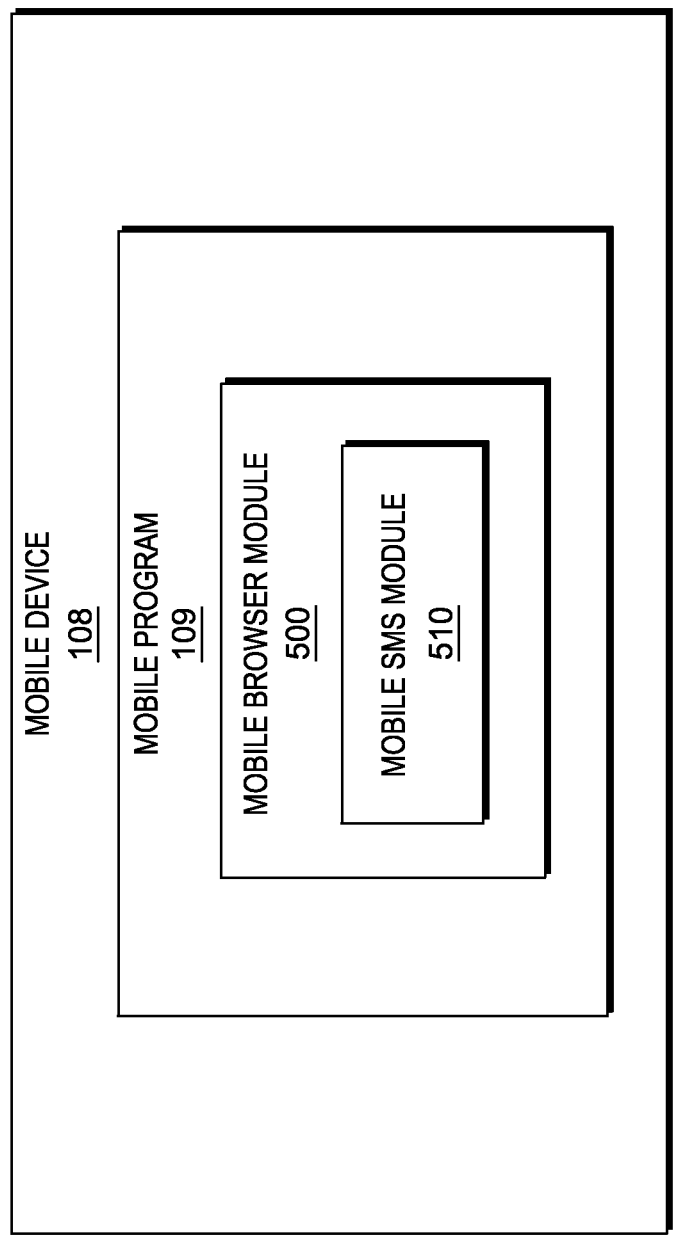
FIG. 5 is a functional block diagram illustrating components of a mobile device of FIG. 1, in accordance with an embodiment of the present invention.

FIG. 5 is a functional block diagram illustrating components of mobile device 108, in accordance with an embodiment of the present invention.

Mobile device 108 comprises mobile program 109. Mobile program 109 can, among other things, retrieve and display content accessible via network 102, such as electronic documents of printing requests transmitted for viewing from server program 104. Mobile program 109 comprises mobile browser module 500. Mobile browser module 500 is a plugin/add-on that extents the functionality of mobile program 109 by adding additional user interface elements to a user interface of mobile program 109. The additional user interface allows dynamic transmission of electronic documents from client program 111 to mobile program 109 based on configurations of client program 111. Mobile browser module 500 is further configured to display the transmitted electronic documents to requestor 113. In addition, the electronic document can be wirelessly transmitted to mobile SMS module 510 as a text message using a short message service (SMS) of mobile program 109.

Figure 6:
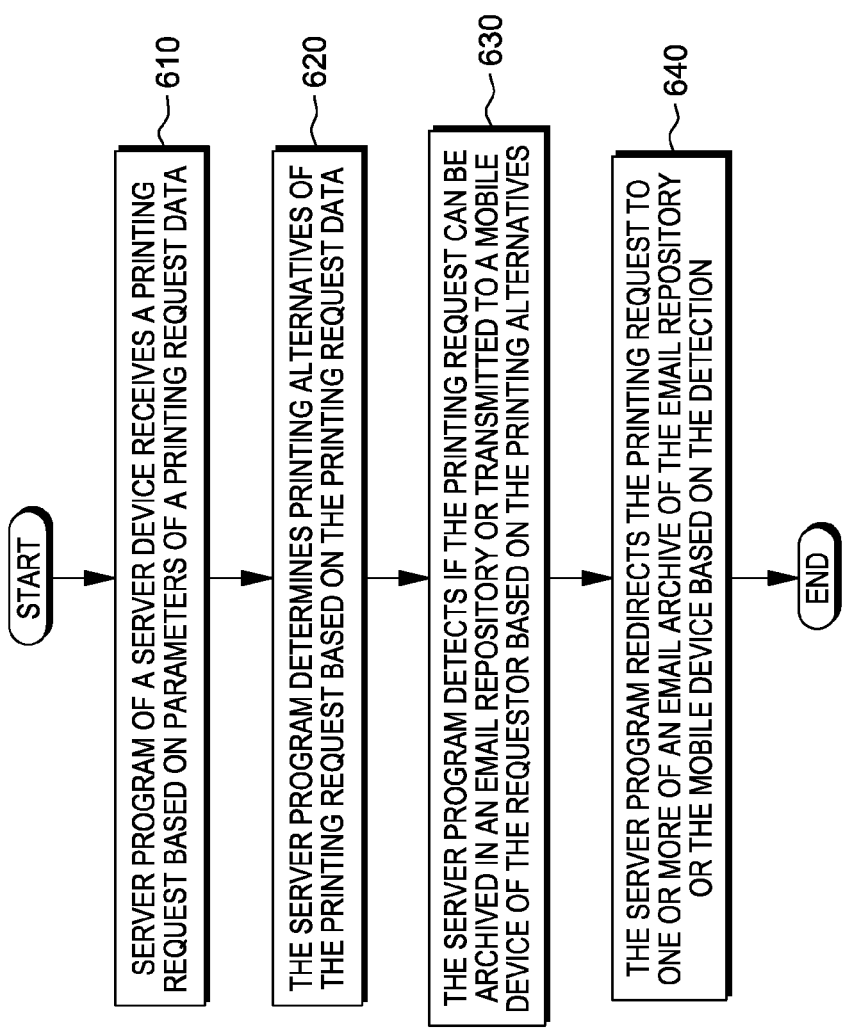
FIG. 6 is a flowchart depicting steps performed by a server program of a server device of FIG. 1, in accordance with embodiments of the present invention.

FIG. 6 is a flowchart depicting steps performed by server program 104 of FIG. 1, in accordance with an embodiment of the present invention.

In step 610, server program 104 receives a printing request based on parameters of a printing request data. The parameters include printing type and printing size of the printing request, including for example, number of pages, page margin data, page layout data, and paper size data of the printing request data. In step 620, server program 104 determines printing alternatives of the printing request based on the parameters. In one embodiment, server program 104 examines email contents of an email of the printing request to determine if the printing request is suitable for archive in email archive storage 360. In step 630, server program 104 detects if the printing request can be archived in email archive storage 360 or transmitted to mobile device 108. In step 640, server program 104 redirects the printing request to one or more of the email archive or mobile device 108 based on the detection in step 630. In one embodiment, either of email display message 430 or mobile display message 460 is displayed to requestor 113 indicating options to transmit the electronic document of the printing request to either of the email archive storage 360 or mobile device 108.

Figure 7:
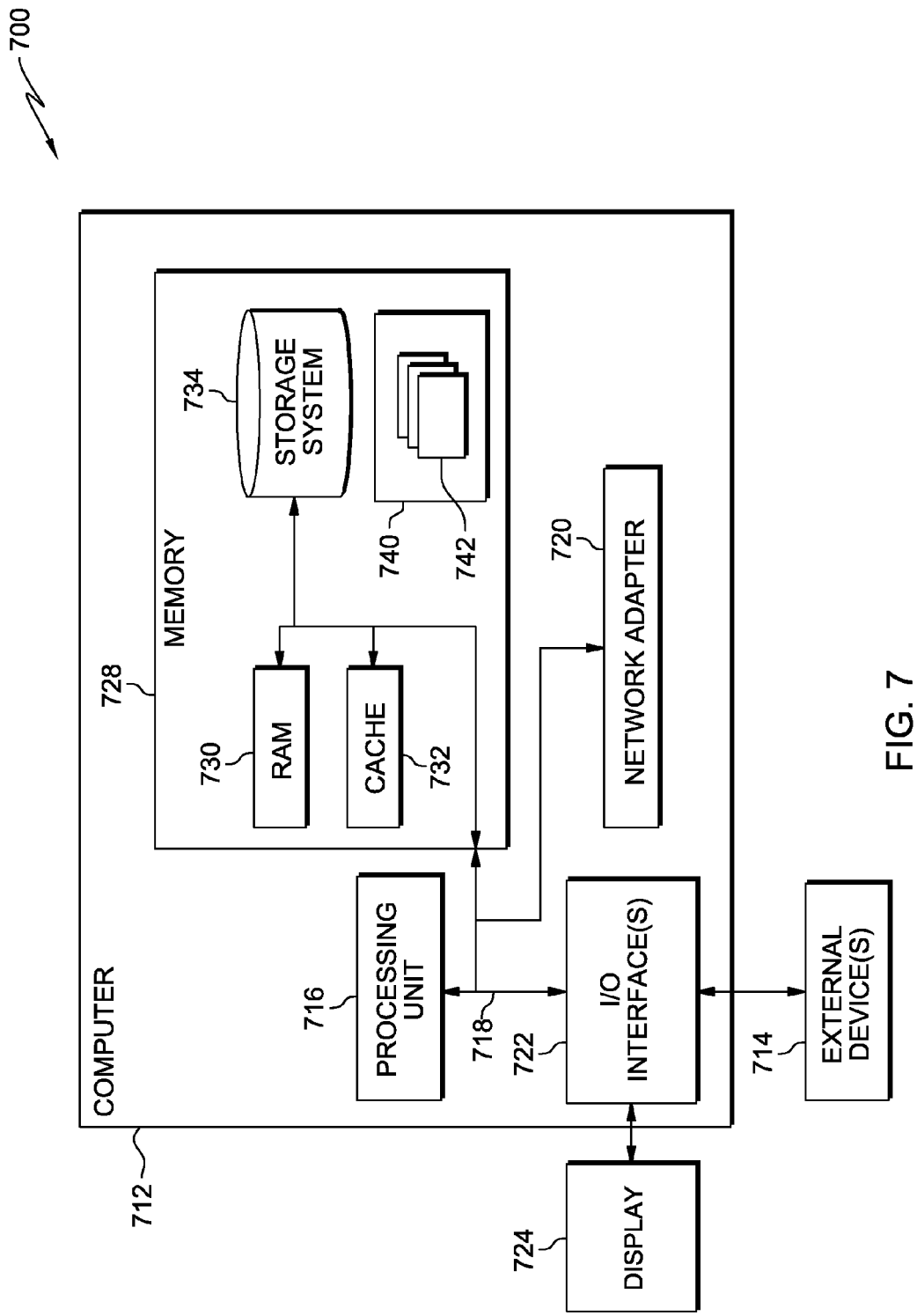
FIG. 7 illustrates a block diagram of components of a computer system in accordance with embodiments of the present invention.

FIG. 7 is a functional block diagram of a computer system, in accordance with an embodiment of the present invention.

Computer system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In computer system 700 there is computer 712, which is operational with numerous other general purpose or special purpose computing system environments or configurations. Examples of well-known computing systems, environments, and/or configurations that can be suitable for use with computer 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of client devices 110, 112, mobile device 108 and server device 105 can include or can be implemented as an instance of computer 712.

Computer 712 can be described in the general context of computer system executable instructions, such as program modules, being executed by a computer system. Generally, program modules can include routines, programs, objects, components, logic, data structures, and so on that perform particular tasks or implement particular abstract data types. Computer 712 can be practiced in distributed cloud computing environments where tasks are performed by remote processing devices that are linked through a communications network. In a distributed cloud computing environment, program modules can be located in both local and remote computer system storage media including memory storage devices.

As further shown in FIG. 7, computer 712 is shown in the form of a general-purpose computing device. The components of computer 712 can include, but are not limited to, one or more processors or processing units 716, memory 728, and bus 718 that couples various system components including memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 712 typically includes a variety of computer system readable media. Such media can be any available media that is accessible by computer 712, and includes both volatile and non-volatile media, and removable and non-removable media. Memory 728 includes computer system readable media in the form of volatile memory, such as random access memory (RAM) 730 and/or cache 732.

Computer 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 can include at least one program product having a set (e.g., at least one) of program modules that are configured to carry out the functions of embodiments of the invention.

Server program 104, mobile program 109 and client program 111 can be stored in memory 728 by way of example, and not limitation, as well as, an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Each one of server program 104, mobile program 109 and client program 111 are implemented as or are an instance of program 740.

Computer 712 can also communicate with one or more external devices 714 such as a keyboard, a pointing device, etc., as well as display 724; one or more devices that enable a user to interact with computer 712; and/or any devices (e.g., network card, modem, etc.) that enable computer 712 to communicate with one or more other computing devices. Such communication occurs via Input/Output (I/O) interfaces 722. Still yet, computer 712 communicates with one or more networks such as a local area network (LAN), a general wide area network (WAN), and/or a public network (e.g., the Internet) via network adapter 720. As depicted, network adapter 720 communicates with the other components of computer 712 via bus 718. It should be understood that although not shown, other hardware and/or software components can be used in conjunction with computer 712. Examples include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention can be embodied as a system, method or computer program product. Accordingly, embodiments of the present invention can take the form of an entirely hardware embodiment, an entirely software embodiment (including firmware, resident software, micro-code, etc.) or an embodiment combining software and hardware aspects that can all generally be referred to herein as a "circuit," "module"

or "system." Furthermore, embodiments of the present invention can take the form of a computer program product embodied in one or more computer-readable medium(s) having computer-readable program code embodied thereon.

In addition, any combination of one or more computer-readable medium(s) can be utilized. The computer-readable medium can be a computer-readable signal medium or a computer-readable storage medium. A computer-readable storage medium can be for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium can be any tangible medium that contains, or stores a program for use by or in connection with an instruction execution system, apparatus, or device.

A computer-readable signal medium can include a propagated data signal with computer-readable program code embodied therein, for example, in baseband or as part of a carrier wave. Such a propagated signal can take any of a variety of forms, including, but not limited to, electro-magnetic, optical, or any suitable combination thereof. A computer-readable signal medium can be any computer-readable medium that is not a computer-readable storage medium and that communicates, propagate, or transport a program for use by or in connection with an instruction execution system, apparatus, or device.

Program code embodied on a computer-readable medium can be transmitted using any appropriate medium, including but not limited to wireless, wireline, optical fiber cable, RF, etc., or any suitable combination of the foregoing. Computer program code for carrying out operations for embodiments of the present invention can be written in any combination of one or more programming languages, including an object oriented programming language such as Java, Smalltalk, C++ or the like, conventional procedural programming languages such as the "C" programming language, a hardware description language such as Verilog, or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for managing printing request, and transmitting the printing requests to either of an email archive or mobile device 108, based on examination of the printing requests. However, numerous modifications and substitutions can be made without deviating from the scope of the present invention. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the Figures. Therefore, the present invention has been disclosed by way of example and not limitation.

What is claimed is:

1. A method for managing printing requests within a computer system based on parameters of a printing request data, the method comprising the steps of:
   receiving a printing request based on parameters of a printing request data of at least one electronic document of an email;
   determining printing alternatives of the printing request based on the printing request data, wherein email contents of the email are examined to determine if the printing request is suitable for archive in an email repository, and wherein a printing type and a printing size of the parameters of the printing request data, are examined to determine if the printing request is suitable for transmission to the mobile device;
   detecting if the printing request can be archived in an email repository or transmitted to a mobile device of a requestor based on the printing alternatives, wherein the email is archived in the email repository based on identification of fields of at least one sender of the email, urgency of the email, and subject matter of the email of the printing request; and
   redirecting the printing request to one or more of an email archive of the email repository or the mobile device based on the detection.

2. The method according to claim 1, wherein the step of examining email contents of the printing request data further comprises:
   parsing one or more header fields of the email contents to identify at least one sender of the email; and
   parsing one or more attachments or one or more plain text body of the email contents to identify subject matter or urgency of the email.

3. The method according to claim 1, wherein the redirected printing request is displayed on the mobile device of the requestor.

4. The method according to claim 1, wherein the printing type and printing size includes one or more of number of pages, page margin data, page layout data, paper size data of the printing request data.

5. The method according to claim 1, wherein the step of redirecting the printing request to one or more of an email archive or a mobile device further comprises:
   indicating an option to the requestor to print an electronic document of the printing request or redirect the printing request to either of one or more of the email archive or the mobile device.

6. The method according to claim 5, wherein, the mobile device includes a contact list of mobile numbers of an individual, or a group of individuals, and wherein, the printing request is directed to the contact list of the individual, or a group of individuals based on the option of the requestor to redirect the printing request to the mobile device.

7. The method according to claim 6, wherein an electronic document is displayed in an interface of the mobile device based on the redirected printing request.

8. The method according to claim 1, further comprising: transmitting a short message service to the mobile device, indicating a message that a printing request is submitted to the mobile device for display the electronic document of the email in an interface of the mobile device.

* * * * *

UNITED STATES PATENT AND TRADEMARK OFFICE
CERTIFICATE OF CORRECTION

| | | |
|---|---|---|
| PATENT NO. | : 8,982,399 B2 | Page 1 of 1 |
| APPLICATION NO. | : 14/150120 | |
| DATED | : March 17, 2015 | |
| INVENTOR(S) | : Darryl B. Bloch et al. | |

It is certified that error appears in the above-identified patent and that said Letters Patent is hereby corrected as shown below:

TITLE PAGE: ITEM 75 insert

--Renee M. Vujakovich, Angier, NC (US)--

Signed and Sealed this
Twenty-third Day of February, 2016

Michelle K. Lee
*Director of the United States Patent and Trademark Office*